United States Patent [19]

Kubo et al.

[11] 4,391,166
[45] Jul. 5, 1983

[54] HYDRAULIC FLUID PRESSURE CONTROL SYSTEM FOR AN AUTOMATIC TRANSMISSION

[75] Inventors: Seitoku Kubo, Toyota; Koujiro Kuramochi, Okazaki; Yukio Terakura, Toyota, all of Japan

[73] Assignee: Toyota Jidosha Kogyo Kabushiki Kaisha, Toyota, Japan

[21] Appl. No.: 174,510

[22] Filed: Aug. 1, 1980

[30] Foreign Application Priority Data

Sep. 10, 1979 [JP] Japan ................... 54-116563

[51] Int. Cl.³ ............... F16H 47/08; B60K 41/10
[52] U.S. Cl. ......................... 74/869; 74/867; 74/752 C; 192/3.31
[58] Field of Search .......... 74/867, 868, 869, 752 C; 192/3.31, 3.3, 103 R

[56] References Cited

U.S. PATENT DOCUMENTS

| | | | |
|---|---|---|---|
| 2,707,887 | 5/1955 | Slack | 192/3.3 X |
| 3,053,116 | 9/1962 | Christenson et al. | 74/868 X |
| 3,096,666 | 7/1963 | Christenson et al. | 74/752 C X |
| 3,239,037 | 3/1966 | Croswhite et al. | 192/3.3 |
| 3,241,399 | 3/1966 | Fisher et al. | 74/752 C X |
| 3,497,043 | 2/1970 | Leonard | 192/3.3 X |
| 3,818,783 | 6/1974 | Norris et al. | 74/867 X |
| 3,861,241 | 1/1975 | Hancock | 74/752 C |
| 4,129,051 | 12/1978 | Shindo et al. | 74/867 |
| 4,134,313 | 1/1979 | Ishikawa | 74/867 |
| 4,294,140 | 10/1981 | Iwanaga et al. | 192/3.31 X |

Primary Examiner—Lawrence J. Staab
Assistant Examiner—Lawrence J. Gotts
Attorney, Agent, or Firm—Birch, Stewart, Kolasch & Birch

[57] ABSTRACT

In an automatic transmission for vehicles which has a fluid torque converter, a lock-up clutch for directly connecting the input and output members of the torque converter when pressure is supplied to its pressure chamber, and a gear transmission mechanism which has several hydraulic fluid actuated friction engaging devices for providing several speed stages: a control system which provides selective supply of pressures for actuating the friction engaging devices, which includes a system for manually selecting any of several desired shift ranges, several shift valves for selectively providing actuating pressures for the friction engaging devices according to the shift range selected by the manual selecting system and according to the balance between the opening of the intake throttle valve of the engine of the vehicle and its road speed, and a system for supplying pressure to the pressure chamber of the torque converter, when any one of several shift ranges is selected by the manual selecting device, only when the highest speed stage available from the gear transmission mechanism, for that shift range, is being provided.

6 Claims, 5 Drawing Figures

HYDRAULIC FLUID PRESSURE CONTROL SYSTEM FOR AN AUTOMATIC TRANSMISSION

BACKGROUND OF THE INVENTION

The present invention relates generally to a hydraulic fluid pressure control system for an automobile automatic transmission, and, more particularly, relates to an improvement in such a hydraulic fluid pressure control system which is used for controlling an automatic transmission which is equipped with a lock-up clutch for locking up a fluid torque converter thereof.

There is known an automatic transmission for automobiles or other vehicles, which comprises a fluid torque converter, a lock-up clutch which, when actuated by supply of hydraulic fluid pressure thereto, directly connects the input and output members of the fluid torque converter, and a gear transmission mechanism equipped with a plurality of friction engagement means for providing a plurality of transmission speed stages. Such an automatic transmission is controlled by a hydraulic fluid pressure control system, which provides selective supply of actuating hydraulic fluid pressures for engaging or disengaging said plurality of friction engaging means, in order correctly to provide a desirable speed stage, according to the operating conditions of the automobile, such as its road speed and the torque being developed by the engine thereof.

In operation of an automatic transmission of this type, it is conventional for the lock-up clutch to be engaged only when the highest speed stage is being provided by the hydraulic fluid pressure control system, when the most commonly used transmission range ("D" range for example) is selected on the manual range selection means, during normal operating conditions; or, alternatively, when the automobile speed is greater than a certain specified value, irrespective of the transmission range selected by the manual range selection means.

However, disadvantages arise with these modes of operation. If the lock-up clutch is engaged only when the highest speed stage is attained in the transmission, the lock-up clutch cannot be effectively utilized when the automobile speed is being reduced by using engine braking by shifting down the selected range of the automatic transmission from this highest speed range to a lower speed range, such as "2" range, which is actually in fact a very desirable time to utilize the lock-up clutch. Further, if the lock-up clutch is always kept engaged when the automobile speed is greater than a certain specified value, irrespective of the speed stage attained, there also arises a disadvantage that, if shifting of the transmission speed stage provided by the automatic transmission occurs during this condition, the action of the fluid torque converter for cushioning the sudden jerking inevitably produced during such speed stage change will not be available, and accordingly the durability of the lock-up clutch, and of the automatic transmission as a whole, may be severely adversely affected because of transmission impact.

SUMMARY OF THE INVENTION

Therefore, it is an object of the present invention to provide an improved hydraulic fluid pressure control system for an automatic transmission equipped with a lock-up clutch, which allows the lock-up clutch to be effectively utilized by improving the control thereof.

It is a further object of the present invention to provide such an improved hydraulic fluid pressure control system which controls the lock-up clutch to be engaged only during operation at the highest speed stage provided by the automatic transmission in either of several transmission shift ranges set by the manual range selection means.

It is a further object of the present invention to provide such an improved hydraulic fluid pressure control system in which the engagement of the lock-up clutch is effectively prevented whenever the automobile speed is less than a certain predetermined value.

Such objects, and others, according to the present invention, are achieved by, in an automatic transmission, for a vehicle comprising a throttle, comprising: a fluid torque converter having input and output members, a lock-up clutch formed with a hydraulic pressure chamber which directly connects said input and output members when hydraulic fluid pressure is supplied to said hydraulic pressure chamber; and a gear transmission mechanism comprising a plurality of hydraulic fluid actuated friction engaging devices for providing a plurality of speed stages: a hydraulic fluid pressure control system which provides selective supply of hydraulic fluid pressures for actuating said plurality of friction engaging devices, comprising: a throttle hydraulic fluid pressure control valve for producing a throttle hydraulic fluid pressure (throttle pressure) according to the amount of actuation of said throttle; a governor hydraulic fluid pressure control valve for producing a governor hydraulic fluid pressure (governor pressure) according to the speed of the vehicle; a means for manually selecting any of a plurality of desired shift ranges; a plurality of shift valves for selectively providing actuating hydraulic fluid pressures for said plurality of friction engaging devices, according to the shift range selected by said manual selecting means, and according to the values of said throttle pressure and said governor pressure; and a means for leading hydraulic fluid pressure to said hydraulic fluid pressure chamber of said torque converter, when any one of a plurality of shift ranges is selected by said manual selecting means, only when the highest speed stage available from said gear transmission mechanism, for that shift range, is being provided by the gear transmission mechanism.

According to such a construction, the operation of the lock-up clutch can be utilized, even when a shift range other than the one which provides the highest speed stage of the transmission is selected on the manual range selection means. As explained above, this is of great benefit for the operation of the automatic transmission, especially during the engine braking condition.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

Figure 1:
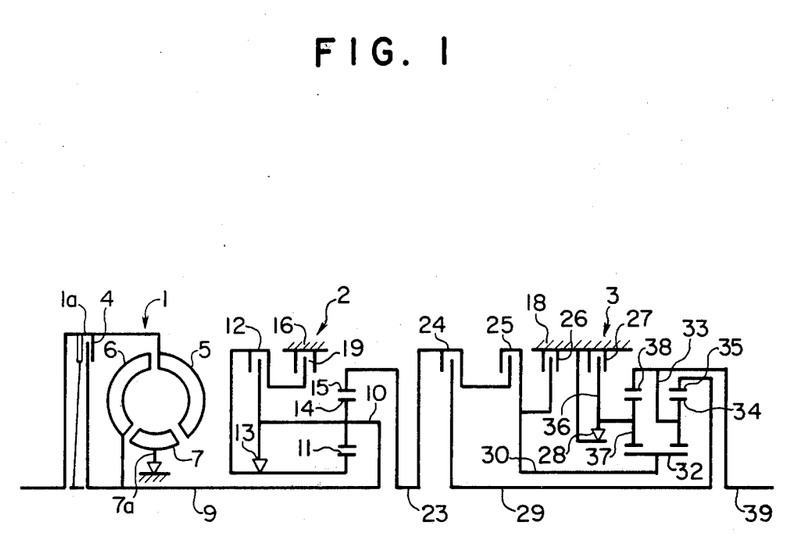
FIG. 1 is a schematic view showing an example of an automatic transmission equipped with a lock-up clutch, to which the present invention is applicable.

Referring first to FIG. 1, here is diagrammatically shown an example of a hydraulic fluid pressure operated automatic transmission. If further details of the physical structure of this automatic transmission are required, reference should be made to the specification and the drawings of Japanese patent application Ser. No. 51-159179 (which has been published as Japanese Patent Laying-Open Publication No. 53-81881), which is a counterpart to a U.S. patent application which has matured into U.S. Pat. No. 4,129,051, except for the structure of the lock-up clutch, which, on the other hand, is per se well known.

Figure 2:
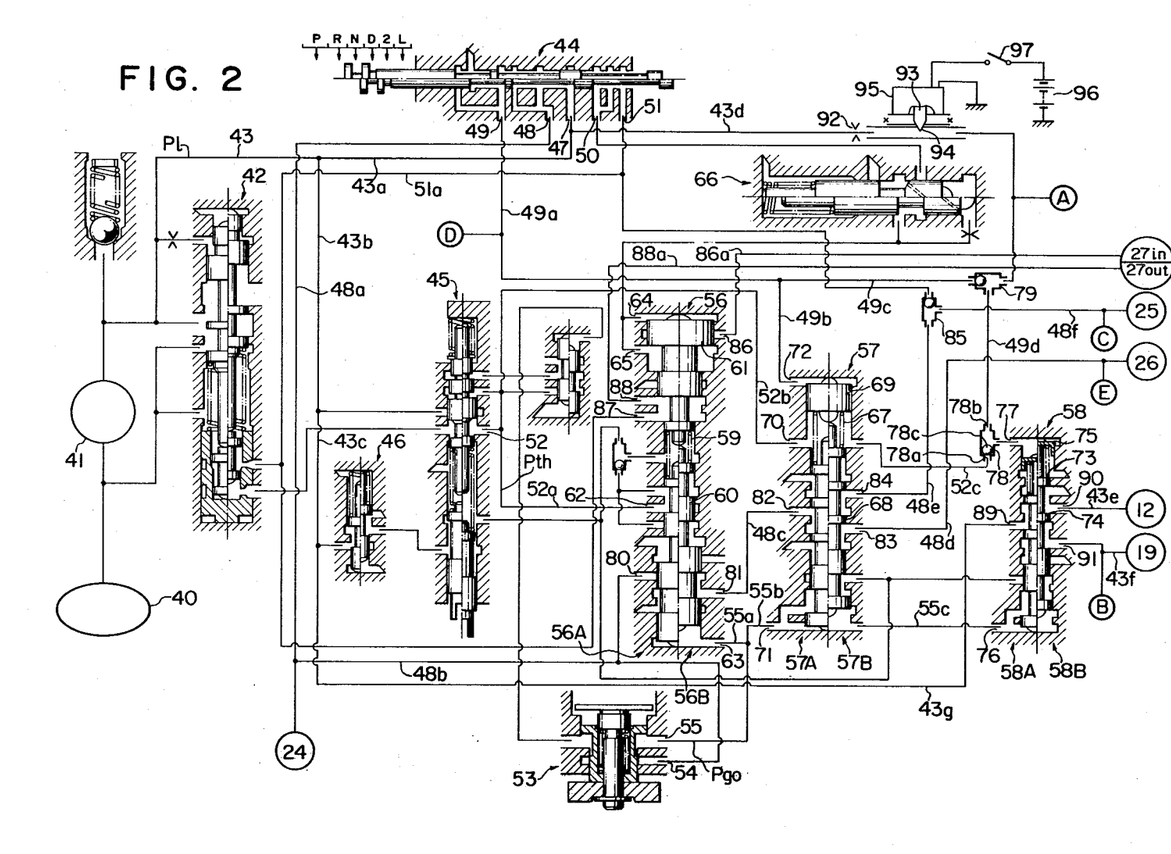
FIG. 2 is a schematic view of part of the hydraulic fluid pressure circuits in a hydraulic fluid pressure control system for the automatic transmission shown in FIG. 1, said hydraulic fluid pressure control system being a preferred embodiment of the hydraulic fluid pressure control system according to the present invention.
Figure 3:
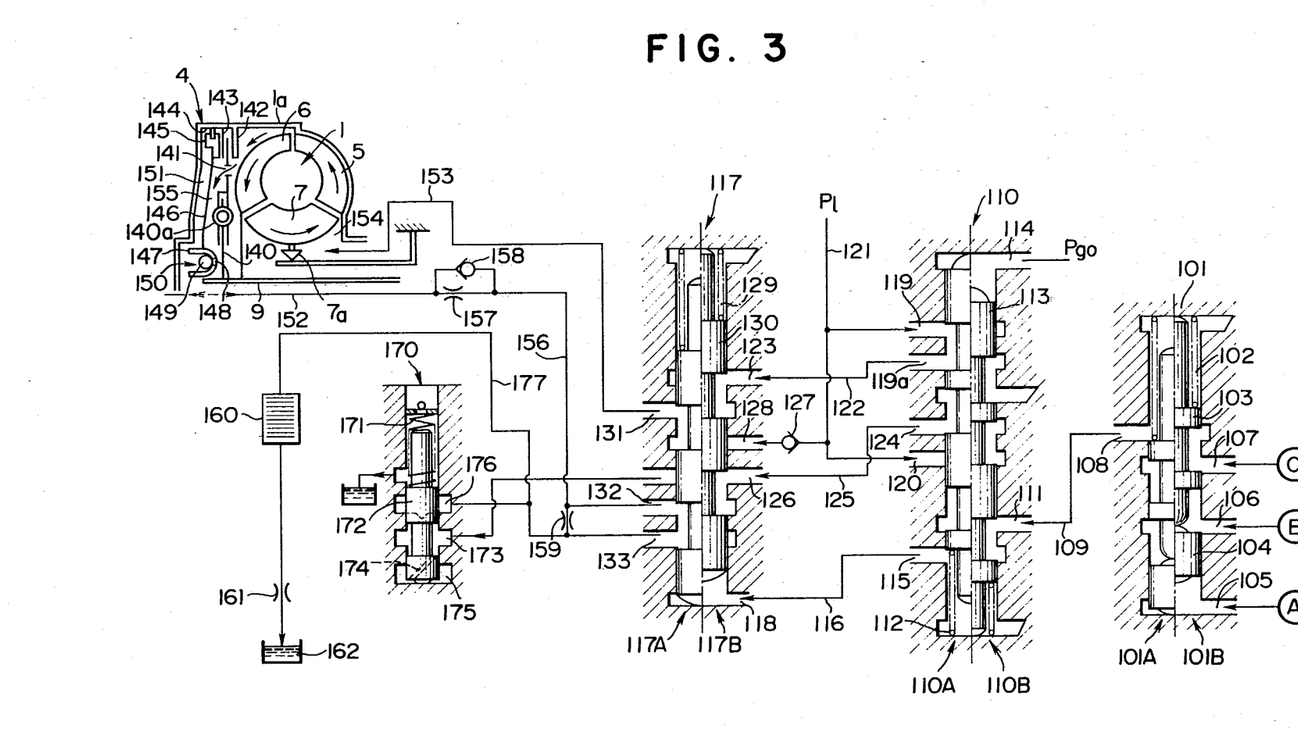
FIG. 3 is a schematic view of another part of the hydraulic fluid pressure circuits in the aforesaid hydraulic fluid pressure control system which is the first embodiment of the present invention.

This automatic transmission comprises a fluid torque converter 1, an overdrive mechanism 2, and a gear transmission mechanism 3 which provides three forward speed stages and one reverse stage, and which is controlled by a hydraulic fluid pressure control system, as shown in FIGS. 2 and 3.

The fluid torque converter 1 comprises a pump impeller 5, a turbine 6, and a stator 7. The pump impeller 5 is connected to the power input shaft of the fluid torque converter 1 which leads to the crankshaft of the internal combustion engine, while the turbine 6 is connected to the turbine shaft 9. The one way clutch 7a supports the stator 7 in a per se well known way. A lock-up clutch 4 is provided to selectively engage directly the torque converter housing 1a of the fluid torque converter 1, which is connected to the pump impeller 5, to the turbine shaft 9.

The turbine shaft 9 constitutes an input shaft for the overdrive unit 2. The turbine shaft 9 is connected to a carrier 10 of the overdrive unit 2. The carrier 10 of the overdrive unit 2 supports rotatably a plurality of planetary pinions 14, all of which are meshed with a sun gear 11 and a ring gear 15. Between the sun gear 11 and the carrier 10 there are provided a first multi-disk clutch 12 and also a one way clutch 13, the first multi-disk clutch 12 being selectively engagable or disengagable by the selective supply of hydraulic fluid control pressure thereto, and a first multi-disk brake 19 is provided between the sun gear 11 and the housing 16 of the overdrive unit 2.

The ring gear 15 of the overdrive unit 2 is connected to the transmission power input shaft 23, which inputs rotary power to the gear transmission mechanism 3. In this gear transmission mechanism 3, between the transmission power input shaft 23 and an intermediate shaft 29, there is provided a second multi-disk clutch 24, and, between the transmission power input shaft 23 and a sun gear shaft 30, there is provided a third multi-disk clutch 25. The second multi-disk clutch 24 and the third multi-disk clutch 25 are both selectively engagable by the selective supply of hydraulic fluid control pressure thereto. Further, between the sun gear shaft 30 and the transmission casing 18 of the gear transmission mechanism 3, there is provided a second multi-disk brake 26, which, again, is selectively engagable or disengagable by the selective supply of hydraulic fluid control pressure thereto. On the sun gear shaft 30 there is mounted a sun gear 32. With this sun gear 32 there are engaged two separate sets of planetary gear pinions, the planetary pinions 34 and the planetary pinions 37. On the outside of the planetary pinions 34, there is meshed a ring gear 35. The ring gear 35, the planetary pinions 34, and the sun gear 32 provide a first planetary gear mechanism. On the outside of the planetary pinions 37 there is meshed a ring gear 38. The ring gear 38, the planetary pinions 37, and the sun gear 32 provide a second planetary gear mechanism. The planetary pinions 37 are all rotatably mounted on a carrier 36, and the planetary pinions 34 are all rotatably mounted on a carrier 33. Between the carrier 36 of the first planetary gear mechanism and the transmission casing 18 of the gear transmission mechanism 3 there is provided a third multi-disk brake 27, which is selectively engagable or disengagable by the selective supply of control hydraulic fluid control pressure thereto, and further there is provided a one way clutch 28. The ring gear 38 of the first planetary gear mechanism is connected to the power output shaft 39 of the gear transmission mechanism 3. Further, the carrier 33 of the second planetary gear mechanism is also connected to the power output shaft 39 of the gear transmission mechanism 3. The ring gear 35 of the second planetary gear mechanism is coupled to the intermediate shaft 29.

According to the power output of the internal combustion engine, i.e., according to the amount of throttle opening thereof, and according to the road speed of the vehicle incorporating the automatic transmission and the internal combustion engine, the operation of the above outlined automatic transmission incorporating an overdrive unit and a gear transmission mechanism is controlled by selective supply of hydraulic fluid control pressure to the various clutches and brakes, which is performed by the hydraulic fluid pressure control system which will be explained in detail hereinafter. Not considering, for the moment, the effect of the operation of the lock-up clutch, the performance of the other hydraulic clutches and hydraulic brakes is so controlled by the hydraulic fluid pressure control system as to provide four forward speed stages and one reverse stage.

TABLE 1

| Friction engaging device Shift position | cl. 12 | cl. 24 | cl. 25 | br. 19 | br. 26 | br. 27 | 1-w.cl. 13 | 1-w.cl. 28 |
|---|---|---|---|---|---|---|---|---|
| PARK | O | X | X | X | X | O | | |
| REVERSE | O | X | O | X | X | O | L | L |
| NEUTRAL | 0 | X | X | X | X | X | | |
| FORWARD | | | | | | | | |
| D range | | | | | | | | |
| 1st. sp. | O | O | X | X | X | X | L | L |
| 2nd. sp. | O | O | X | X | O | X | L | F |

TABLE 1-continued

| Friction engaging device Shift position | cl. 12 | cl. 24 | cl. 25 | br. 19 | br. 26 | br. 27 | 1-w.cl. 13 | 1-w.cl. 28 |
|---|---|---|---|---|---|---|---|---|
| 3rd. sp. | O | O | O | X | X | X | L | F |
| 4th. sp. (O/D) | X | O | O | O | X | X | F | F |
| 2 range |  |  |  |  |  |  |  |  |
| 1st. sp. | O | O | X | X | X | X | L | L |
| 2nd. sp. | O | O | X | X | O | X | L | F |
| L range | O | O | X | X | O | O | L | L |

Table 1 shows the operating conditions of each of the clutches and brakes (except the lock-up clutch 4), for the various gear stages provided by the automatic transmission described above.

In the Table, a "O" indicates that the relevant clutch or brake is engaged, an "X" indicates that it is released, a "L" indicates that a one way clutch is locked, and a "F" indicates that a one way clutch is in the overrun condition.

In FIGS. 2 and 3, a schematic hydraulic fluid circuit diagram of a hydraulic fluid pressure control system for the automatic transmission schematically shown in FIG. 1, according to a preferred embodiment of the present invention, is shown.

A hydraulic fluid pump 41 draws up hydraulic fluid from a hydraulic fluid reservoir 40 and transmits a supply of hydraulic fluid under pressure to a line hydraulic fluid pressure control valve 42, which produces a controlled line hydraulic fluid pressure (line pressure) Pl in the passage 43. This line pressure is supplied to an input port 47 of a manual range selection valve 44 through a passage 43a, and is also supplied to a throttle hydraulic fluid pressure control valve 45 through a passage 43b, and to a detent hydraulic fluid pressure control valve 46 through a passage 43c.

The manual range selection valve 44 is of a per se well known type, and is adapted to be manually shifted between various shift ranges: parking "P" range, reverse "R" range, neutral "N" range, drive "D" range, second "2" range, and low "L" range. The line pressure which is supplied to an input port 47 of the manual range selection valve 44 is selectively communicated to output ports 48, 49, 50, and/or 51 thereof, according to the shift range selected by the manually shifted position of the manual range selection valve 44.

In Table 2, the hydraulic fluid pressure at each of these ports is shown, for the various shift ranges selected on the manual range selection valve 44.

TABLE 2

| Shift condition | P | R | N | D | 2 | L |
|---|---|---|---|---|---|---|
| PORT |  |  |  |  |  |  |
| 48 |  |  |  | 0 | 0 | 0 |
| 49 |  |  |  |  | 0 | 0 |
| 50 | 0 | 0 |  |  |  | 0 |
| 51 |  | 0 |  |  |  |  |

The throttle hydraulic fluid pressure control valve 45 receives the line pressure through the passage 43b, and produces at its output port 52 a throttle hydraulic fluid pressure (throttle pressure) Pth which increases or diminishes, depending on the amount of opening provided by a throttle valve of the internal combustion engine to which the automatic transmission is fitted, i.e., according to the amount by which the accelerator pedal of the vehicle to which the transmission is fitted is depressed.

The output port 48 of the manual range selection valve 44 is communicated, via the a passage 48a, to the second multi-disk clutch 24, and a passage 48b which branches therefrom is communicated to an input port 54 of a governor hydraulic fluid pressure control valve 53. The governor hydraulic fluid pressure control valve 53 produces a governor hydraulic fluid pressure (governor pressure) Pgo at its output port 55, which increases or decreases, depending upon increase or decrease of the road speed of the automobile to which the transmission is fitted, by the valve 53 controlling the hydraulic fluid pressure supplied to its input port 54 according to the movement of an element therein which is moved by the balance of a centrifugal force caused by rotation of the output shaft of the transmission, and the sum of a restoring force produced by a compression coil spring and that produced by the governor pressure generated, in a per se well known fashion.

In the hydraulic fluid pressure circuit shown in FIG. 2, there are provided a ½ speed shift valve 56, a ⅔ speed shift valve 57, and a 3/OD shift valve 58.

In the body of the ½ speed shift valve 57 there are mounted a lower valve element 60 and an upper valve element 61 in coaxial relation with a compression coil spring 59 mounted between them so as to bias them apart. The lower valve element 60 may assume either a downwardly biased position in the figure, denoted by 56A, or an upwardly biased position in the figure, denoted by 56B, according to the equilibrium condition between (a) a downward force, which is the sum of the downward force exerted by the compression coil spring 59 and the downward force exerted by the throttle pressure Pth, via a port 62 and via a passage 52a, and (b) an upward force, which is exerted by the governor pressure Pgo via a port 63, and via a passage 55a. The upper valve element 61 is driven by a hydraulic fluid pressure which appears at a ports 64 and 65, said hydraulic fluid pressure being the hydraulic fluid pressure which appears at the output port 50 of the manual range selection valve 44, when the manual range selection valve is manually set to "L" range, controlled by a low modulator valve 66. When this hydraulic fluid pressure is present, the upper valve element 61 is biased downwardly in the drawing, and forcibly biases the lower valve element 60 to its lowermost position in the drawing denoted by 56A.

The ⅔ speed shift valve 57, likewise, comprises mounted within its body in axially opposed relationship a lower valve element 68 and an upper valve element 69, with a compression coil spring 67 mounted between them so as to bias them apart from one another. The lower valve element 68 may assume either its downwardly shifted position indicated in the drawing by 57A, or its upwardly shifted position indicated in the drawing by 57B, according to the equilibrium condition between (a) a downward force which is the sum of the downward force exerted by the compression coil spring 67 and the downward force exerted by the throttle pressure Pth via a port 70 and a passage 52b, and (b) the upward force exerted by the governor pressure Pgo via a port 71 and via a passage 55b. Further, the upper surface of the upper valve element 69 is provided with the hydraulic fluid pressure which is present at the output port 49 of the manual range selection valve 44, via the passages 49a 49b, and via a port 72. Accordingly, when the manual range selection valve 44 is shifted to the "2" range, this hydraulic fluid pressure is produced at its output port 49, and is applied to the upper surface of the upper valve element 69 so as positively to bias it downwards in the diagram, so as forcibly to bias the lower valve element 68 to its downward position indicated in the diagram by 57A.

The 3/OD speed shift valve 58 is provided, as mounted coaxially within its body, with a lower valve element 74 and an upper valve element 75, an compression coil spring 73 being mounted between them. The governor pressure Pgo is supplied to a port 76 of the valve 58, via passages 55b, and 55c. The upper end in the drawing of the upper valve element 75 is provided with either one of three possible hydraulic fluid pressures: (a) the throttle pressure, which is supplied thereto via the port 70 of the ⅔ speed shift valve 57, a passage 52c and a shuttle valve 78; (b) the line pressure, which appears at the output port 49 of the manual range selection valve 44 when the manual range selection valve 44 is set to "2" range or "L" range manually by the operator of the automobile, via the passage 49a, a passage 49c, a shuttle valve 79, a passage 49d, and the shuttle valve 78; or (c) the line pressure, supplied through a passage 43d, a shuttle valve 79, the passage 49d, and the shuttle valve 78.

Thus, when the line pressure is not supplied to a port 78b, the throttle hydraulic fluid pressure which is supplied to a port 78a of the shuttle valve 78, is supplied, by biasing a ball 78a upward in the figure, to the port 77 of the switching valve 58, and bears upon the upper side of the upper valve element 75 thereof, and, thereby, the lower valve element 74 of the switching valve 58 is either biased to its downward position, shown in the diagram by 58A, or to its upward position, shown in the diagram by 58B, according to the equilibrium condition between the throttle pressure, and the governor pressure which is supplied to the port 76 of said valve 58. However, as will be explained later, when at the port 78b of the shuttle valve 78 there is present the line pressure, which is greater than the throttle pressure, the port 77 of the 3/OD speed shift valve 58 is thereby supplied with this line pressure, and thereby the upper valve element 75 is forcibly downwardly biased, and thus forcibly downwardly biases the lower valve element 74 to its position indicated by 58A, thereby retaining the 3/OD speed shift valve 58 forcibly in its selected position 58A, without any reference to the automobile road speed.

When the manual range selection valve 44 is manually set by the driver of the automobile to the "D" range, a port 80 of the ½ speed shift valve 56 is supplied with the line pressure, provided at the output port 48 of the manual range selection valve 44, via the passages 48a and 48b. This line pressure, when the ½ speed shift valve 56 is in its upwardly biased position, indicated in the drawing by 56B, is conducted to a port 81 thereof, and via a passage 48c is conducted to a port 82 of the ⅔ speed shift valve 57. When the shift valve 57 is in its downwardly biased position, as indicated in the drawing by 57A, this line pressure is conducted to its port 83, and thence, via a passage 48d, to the second multi-disk brake 26. On the other hand, when the shift valve 57 is in its upwardly biased position, indicated in the drawings by 57B, this line pressure which is present at the port 82 is conducted to its port 84, and thence, via a passage 48e, and via the shuttle valve 85, is supplied to the third multi-disk clutch 25 via a passage 48f.

When the manual range selection valve 44 is set to "L" range by the driver of the automobile, the line pressure which is produced at its output port 50 is supplied, via the low modulator valve 66, to the ports 64 and 65 of the ½ speed shift valve 56, and, as well as biasing forcibly the upper valve element 61 and the lower valve element 60 downwards in the drawing to their downwardly biased positions indicated by 56A, as explained above, is also conducted to the port 86 of the shift valve 56, and therefrom, via a passage 86a, is supplied to the inside part of the third multi-disk brake 27, i.e., of the first/reverse brake.

In this connection, when the manual range selection valve 44 is shifted manually by the operator of the automobile to "R" range, then line pressure appears at the output port 51 thereof, and, via a passage 51a, ports 87 and 88 of the ½ speed shift valve 56, and via a passage 88a is supplied to the outside part of the third multi-disk brake 27, so as to engage it.

Line pressure is supplied, via the passage 43, 43b, 43c, and 43g, to a port 89 of the 3/OD speed shift valve 58. When this shift valve 58 is in its downwardly shifted position, indicated in the drawings by 58A, this line pressure which is supplied to its port 89 is supplied, via its port 90 and a passage 43e, to the first multi-disk clutch 12 of the overdrive unit 2. However, when the lower valve element 74 of the shift valve 58 is shifted to its upwardly shifted position indicated in the drawing by 58B, then this line pressure supplied to its port 89 is instead supplied to its port 91, and thence, via a passage 43f, is supplied to the first multi-disk brake 19 of the overdrive unit 2.

A throttling element 92 is provided in the passage 43d, and downstream of this throttling element 92 there is provided a drain port 94, whose opening and closing is controlled by a valve element 93. The valve element 93, in this embodiment, is moved so as to open and close the drain port 94 by the action of a solenoid 95. In fact, the valve element 93 is biased to the position in which it closes the drain port 94 by a compression coil spring not shown in the drawing, and, when the solenoid 95 is energized by supply of electrical current thereto, is upwardly pulled in the drawing, so as to open the drain port 94. In this embodiment, the solenoid 95 is selectively energized by electric power from the battery 96 of the automobile, under control of a manual switch 97. This manual switch 97 is used by the driver of the automobile in order to control the activation of the overdrive unit 2.

When the manual switch 97 is closed by the driver of the automobile, the solenoid 95 is energized, so as upwardly to bias the valve element 93, against the biasing action of the compression coil spring, so that the drain port 94 is opened. In this condition, the line pressure, if it is present in the passage 43d, and passes the throttling element 92, is released through the drain port 94, and therefore no effective hydraulic fluid pressure will be transmitted downstream of the drain port 94 to the shuttle valve 79. On the other hand, if the manual switch 97 is opened by the driver of the automobile, then the solenoid 95 is not supplied with actuating electrical force, and, accordingly, the valve element 93 is biased by the compression coil spring to its position where it closes the drain port 94, and, accordingly, under this condition, the line pressure, if it is present in the passage 43d, is effectively conducted, via the throttling element 92, past the closed drain port 94, to the shuttle valve 79, and thence, via the passage 49d, via the shuttle valve 78, is transmitted to the port 77 of the 3/OD speed shift valve 58, and, accordingly, as previously referred to, positively biases the upper valve element 75 and thereby the lower valve element 74 of the shift valve 58 to their downwardly biased positions, indicated in the drawing by 58A. This downward biasing will occur irrespective of the governor pressure Pgo transmitted to the port 76. Therefore, if the manual range selection valve 44 is set by the driver of the automobile to the "D" range, and the manual switch 97 is closed by the driver of the automobile, then the condition of providing overdrive by the overdrive unit 2 will be attained, or not, as the case may be, depending upon the equilibrium condition obtained between the amount of depression of the accelerator pedal of the automobile, and the automobile road speed. However, if, when the manual range selection valve 44 is selected to the "D" range, the manual switch 97 is opened by the driver of the automobile, then the abovementioned overdrive condition will never be obtained, irrespective of the aforesaid equilibrium condition between the accelerator pedal depression and the automobile road speed.

The other hydraulic fluid control valves, hydraulic fluid conduits, ports, and shuttle valves, shown in FIG. 2, are for providing various correcting hydraulic fluid control pressures to the line hydraulic fluid pressure control valve 42, and the throttle hydraulic fluid pressure control valve 45, and for other purposes which are not directly relevant for an understanding of the present invention, and, accordingly, description thereof will be omitted for the sake of brevity of explanation.

Figure 4:
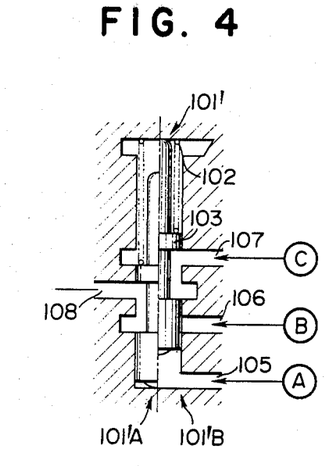
FIG. 4 is a schematic view of another embodiment for the hydraulic fluid pressure switching valve used in the hydraulic fluid pressure control circuit shown in FIG. 3.
Figure 5:
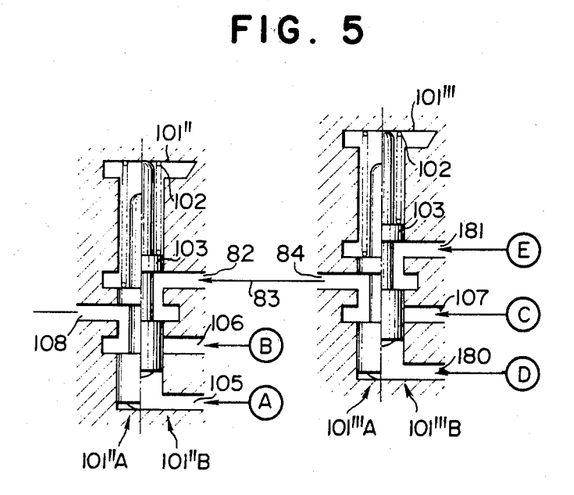
FIG. 5 is a view of still another embodiment for the hydraulic fluid pressure switching valves used in the hydraulic fluid pressure control circuit shown in FIG. 3.

The symbols "A," "B," "C," "D," and "E" in FIG. 2, are symbols denoting the points at which passages which lead to various ports in the valves shown in FIGS. 3, 4 and 5, alternatively, in various embodiments of the present invention, are connected. Thus, such symbols in FIGS. 3, 4 and 5 correspond to the respective symbols in FIG. 2.

In FIG. 3, there is shown the part of the first embodiment of the present invention which particularly controls the lock-up clutch 4. This part of the hydraulic fluid pressure control circuit of the hydraulic fluid pressure control system has been isolated in this figure for the sake of convenience and clarity of description.

A switching valve 101 is provided, which comprises an upper valve member 103 and a lower valve member 104 which are arranged coaxially within its body, with a compression coil spring 102 arranged above them in the drawing so as to bias them both downwards in the drawing to their downwardly biased positions indicated by 101A. To the lower end of the lower valve member 104 in the drawing there is supplied the hydraulic fluid pressure which is present in the passage 43d of FIG. 2, downstream of the throttling element 92 and the drain port 94, as denoted by the symbol "A," via a port 105 of the switching valve 101. Further, as denoted by the symbol "B," the hydraulic fluid pressure which is present in the passage 43f of FIG. 2, and which actuates the first multi-disk brake 19 of the overdrive unit 2, is supplied, via a port 106, to the lower end of the upper valve member 103. Further, the hydraulic fluid pressure which is supplied to the third multi-disk clutch 25 is supplied from the passage 48f of FIG. 2, as denoted by the symbol "C," to a port 107 of the switching valve 101.

According to this construction, when the manual switch 97 is closed, so that, as explained above, the 3/OD speed shift valve 58 is allowed to provide overdrive condition for the automatic transmission according to the balance of the road speed of the automobile and the throttle opening thereof, the port 105 of the switching valve 101 is not supplied with hydraulic fluid pressure, and, accordingly, the lower valve member 104 thereof is definitely in its downwardly biased position, indicated in the drawing by 101A. If, at this time, the 3/OD speed shift valve 58 is in its overdrive non actuating position, i.e., the downwardly biased position thereof, indicated in FIG. 2 by 58A, then no hydraulic fluid pressure will be present at the port 106 of the switching valve 101, because no hydraulic fluid pressure is present in the passage 43f leading to the first multi-disk brake 19, and, accordingly, the upper valve member 103 of the switching valve 101 will also be in its upwardly biased position in the drawing, indicated by 101A, and, accordingly, no hydraulic fluid pressure will be produced at the port 108 of the switching valve 101. On the other hand, when, in the above described closed condition of the manual switch 97, the lower valve element 74 of the 3/OD speed shift valve 58 is in its upwardly biased position, indicated in FIG. 2 by 58B, then, on the contrary, the line pressure is present at the port 91 thereof, and is supplied to the passage 43f and is therefore, as indicated by the symbol "B," supplied to the port 106 of the switching valve 101, and accordingly biases the upper valve member 103 of the switching valve 101 to its upwardly biased position indicated in FIG. 3 by 101B. If, during this condition, hydraulic fluid pressure is present at a port 107 of the switching valve 101, i.e. is present in the passage 48f in FIG. 2 which leads to the third multi-disk clutch 25, as per the symbol "C," then this hydraulic fluid pressure will be communicated to a port 108 of the switching valve 101.

On the other hand, when the manual switch 97 is opened by the driver of the automobile, so as to inhibit selection of overdrive condition by the overdrive unit 2, then the line pressure will be present in the passage 43d of FIG. 2, downstream of the throttling element 92 and of the drain port 94, i.e. the point indicated by the symbol "A," and will be supplied to the port 105 of the switching valve 101, and will accordingly definitely bias the upper valve member 103 of the switching valve 101 upwardly, as indicated in the drawing by 101B. Thus, the upper valve member 103 will also be shifted to its upwardly biased position, and, accordingly, if line pressure is supplied to the port 107, this line hydraulic fluid pressure will be transmitted to the port 108. This line pressure at the point designated by the symbol "C," which comes from the passage 48f in FIG. 2, will be present when and only when the transmission is shifted to its third speed. However, when the transmission is shifted to its second or its first speed, then the passage 48f will not be supplied with hydraulic fluid pressure, and, accordingly, no hydraulic fluid pressure will be present at the port 108 of the switching valve 101.

It will be understood from the above description that when either the "D" range including the use of the overdrive speed provided, or the "D" range not including the use of the overdrive, speed is selected manually by using the manual range selection valve 44 and the manual switch 97, then, when and only when the highest speed is attained in either one of these shift ranges, hydraulic fluid pressure will be produced at the port 108 of the switching valve 101. That is to say, when the manual range selection valve 44 is shifted to its "D" range, and further the manual switch 97 is closed, thereby allowing the automatic transmission to operate in so-called "D-overdrive" range, then hydraulic fluid pressure will be present at the port 108 of the switching valve 101 when and only when the automatic transmission is actually operating in the overdrive condition. Similarly, when the manual range selection valve 44 is set to its "D" range and the manual switch 97 is opened, thereby setting the automatic transmission as a whole into its "D-No-overdrive" range, then hydraulic fluid pressure is present at the port 108 of the switching valve 101 when and only when the automatic transmission is actually operating in its third speed condition, which is its highest speed condition available in this "D-No-overdrive" range.

The hydraulic fluid pressure, when it is produced at the port 108 of the switching valve 101, is supplied to a port 111 of a fail safe valve 110 via a passage 109. In the body of the valve 110 there is received a valve element 113, which is biased upwardly in the drawing to its position designated by 110A by a compression coil spring 112. To the upper end of the valve element 113, the governor pressure Pgo is supplied via the port 114, and thus the valve element 113 is shifted to its upwardly biased position, indicated in the drawing by 110A, when the governor pressure Pgo is less than a set predetermined value, while the valve element 113 is shifted to its downwardly biased position, indicated in the drawings by 110B, when the governor pressure Pgo is greater than said set predetermined value. When, and only when, the valve element 113 is in its downwardly biased position, the hydraulic fluid pressure which is supplied to the port 111 is transmitted to a port 115 and therefrom is supplied to a port 118 of a lock-up clutch control valve 117 via a passage 116.

Further, via a passage 121, the line pressure is supplied to ports 119 and 120 of the fail safe valve 110. When, and only when, the valve element 113 of the fail safe valve 110 is in its upwardly biased position, the line pressure supplied to the port 119 is transmitted to the port 119a, whence, via a passage 122, it is supplied to a port 123 of the clutch control valve 117. On the other hand, when and only when the valve element 113 of the fail safe valve 110 is in its downwardly biased position, then the line pressure supplied to the port 120 of the fail safe valve 110 is transmitted to its port 124, whence, via a passage 125, this line pressure is supplied to a port 126 of the clutch control valve 117. Further, the line pressure, which is present in the passage 121 is directly supplied to a port 128 of the clutch control valve 117, via a one way valve 127.

In the body of the clutch control valve 117 there is fitted a valve element 130, which is biased to its downward position indicated by 117A by a compression coil spring 129. When no hydraulic fluid pressure is supplied to the port 118 of the clutch control valve 117, the valve element 130 thereof is in its downwardly biased position indicated by 117A, and at this time the line pressure present at the port 128 of the clutch control valve 117 is transmitted to a port 131 thereof. Further, in this condition, a ports 132 and 133 of the clutch control valve 117 are communicated with one another. On the other hand, when hydraulic fluid pressure is supplied to the port 118 of the clutch control valve 117, then the valve element 130 thereof is biased to its upward position, indicated by 117B, against the resisting action of the compression coil spring 129, and in this condition the port 132 of the clutch control valve 117 is cut off from communication with the port 133 thereof, while also the supply of line hydraulic fluid pressure from the port 128 to the port 131 is cut off, while on the other hand supply of hydraulic fluid pressure from the port 119a of the fail safe valve 110, via the passage 122, and via the port 123 of the clutch control valve 117, is made available to the port 131 of the clutch control valve 117. Further, in this condition, the port 132 of the clutch control valve 117 is communicated to the port 126 thereof, and therefore receives supply of hydraulic fluid pressure from the port 124 of the fail safe valve 110, via the passage 125.

The structure of the lock-up clutch 4 incorporated in the torque converter housing 1a of the fluid torque converter 1 will now be described.

A clutch disk 140 is fixed to the turbine shaft 9. This clutch disk 140 is fitted with a plurality of clutch compression coil springs 140a, which provide a certain amount of buffering effect in the transmission of torque by the clutch disk 140, and further is provided with an orifice 141, pierced through it. On the inner circumference of the torque converter housing 1a there is fixed an annular clutch element 142, opposing the periphery of the clutch disk 140, and to the left of the annular clutch element 142 in the drawing, also coupled to the inner circumference of the torque converter housing 1a, there is provided an axially movable annular clutch plate 143, opposing the other side of the periphery of the clutch disk 140, which thus passes between this annular clutch element 142 and this annular clutch plate 143. To the left of the annular clutch plate 143 in the drawing, the inner surface 144 of the torque converter housing 1a is formed as a cylinder bore, in which an annular piston 145 is slidably engaged with a seal element providing a seal therebetween. A flexible disk 146 is fixed to the left hand side in the drawing of the periphery of the annular piston 145. The inner part of this flexible disk 146 is fixed to a disk hub 147. In the disk hub 147 there is provided a one way valve 150 which comprises a valve port 148 and a ball 149. Thus, on the left hand side in the drawing of the piston system which comprises the annular piston 145 and the flexible disk 146, there is therefore defined a pressure chamber 151. When this pressure chamber 151 is supplied with hydraulic fluid pressure, it biases the annular piston 145 in the right hand direction in the drawings against the left hand side of the annular clutch plate 143, pushing the plate 143 to the right, and thus the outer periphery of the clutch disk 140 is pinched between the annular clutch plate 143 and the annular clutch element 142, thereby directly mechanically engaging the torque converter housing 1a and the turbine shaft 9.

Supply of actuating hydraulic fluid pressure to the pressure chamber 151 is made through the passage 152, which passes through the center of the turbine shaft 9. Supply of hydraulic fluid pressure to the hydraulic fluid circuit in the fluid torque converter 1, around which hydraulic fluid is circulated by the pump impeller 5, the turbine 6, and the stator 7, is made through the passage 153, via a pump input region 154.

Thus, when the fluid torque converter 1 is performing its fluid coupling function, i.e., when the direct engagement clutch 4 is released, then hydraulic fluid pressure is supplied to the pump input region 154 via the passage 153, and from the pump input region 154 is further supplied to the hydraulic fluid circulating passage which passes through the pump impeller 5, the turbine 6, and the stator 7, and a part of the hydraulic fluid circulating around this hydraulic fluid circuit also, via the orifice 141 formed in the clutch disk 140, passes into a chamber 155 formed between the flexible disk 146 and the clutch disk 140. Thus, due to this hydraulic fluid pressure which has reached the chamber 155, the flexible disk 146 is deflected to the left in the drawing, so as positively to release the direct engagement clutch 4, by biasing the annular piston 145 to the left in the drawing, and thereby releasing the pinching of the periphery of the clutch disk 140 between the annular clutch element 142 and the annular clutch plate 143. Because of the provision of the one way valve 150, the hydraulic fluid which is supplied to this chamber 155 passes through the one way valve 150, and can enter into the passage 152. Thus, simultaneously with the assured disengagement of the direct engagement clutch 4, there is provided this hydraulic fluid circulating path for venting hydraulic fluid from the fluid torque converter 1, thus providing cooling for the fluid torque converter 1 and hindering its overheating.

The passage 152 formed down the center of the turbine shaft 9 is connected, via a throttling element 157, which is bypassed by a one way valve 158, directly to the port 132 of the clutch control valve 117, through a passage 156. Further, through a throttling element 159, this passage 156 leads to the port 133 of the clutch control valve 117, and this port 133 is also led, via a drain passage 177, and via a hydraulic fluid cooler 160 and a throttle element 161 to a reservoir 162.

Further there is provided a lock-up clutch hydraulic fluid pressure control valve 170, for properly controlling the hydraulic fluid pressure which, when the valve element 130 of the clutch control valve 117 is in its upwardly biased position as indicated by 117B, is supplied to the pressure chamber 151 of the lock-up clutch 4. This pressure control valve 170 is provided with a valve element 172 which is biased in a downwards direction in the drawings by a compression coil spring 171. The hydraulic fluid pressure which is supplied, as explained above, to the pressure chamber 151 of the lock-up clutch 4, and which is also supplied to a port 173 of the valve 170, is led to a valve chamber 175 of the pressure control valve 170 via an orifice 174 formed in the valve element 172, and thereby acts on the lower end surface of the valve element 172, urging it upwards in the drawing. Therefore, if this hydraulic fluid pressure becomes too great, the valve element 172 of the pressure control valve 170 is shifted sufficiently far upwards in the drawing, against the biasing action of the compression coil spring 171, for a part of this hydraulic fluid which is present at its port 173 to escape to its valve chamber 176, whence, via the drain passage 177, the hydraulic fluid cooler 160, etc., it is drained. Thereby, the hydraulic fluid pressure acting at the port 173 of the pressure control valve 170, and thus the hydraulic fluid pressure in the passage 156, is regulated so as not to exceed a certain specified value.

As may be understood from the preceding description, when the highest speed stage available from the automatic transmission is actually selected, in either the "D-overdrive" range or the "D-non-overdrive" range as selected by the driver of the automobile, a hydraulic fluid pressure is produced at the port 108 of the switching valve 101, and, when the automobile road speed is higher than a certain given specified value, and therefore the valve element 113 of the fail safe valve 110 is in its downwardly biased position, as indicated by 110B, then this hydraulic fluid pressure, via the passage 109 and the port 111 of the fail safe valve 110, is provided to the port 115 thereof, and, via the passage 116, is provided to the port 118 of the clutch control valve 117, so as to bias the valve element 130 of the clutch control valve 117 into its upwardly selected position, as indicated by 117B. In this condition, the line hydraulic fluid pressure which is supplied through the passage 121 is transmitted through the port 120 of the fail safe valve 110 to the port 124 thereof, and thence via the passage 125 is transmitted to the port 126 of the clutch control valve 117, whence it is transmitted to the port 132 thereof. From the port 132, this line hydraulic fluid pressure is transmitted through the passage 156, the throttling element 157, and the passage 152 to pass into the pressure chamber 151 of the lock-up clutch 4, so as to engage the clutch 4.

On the other hand, if the automatic transmission is not providing the highest speed stage available in either of the abovementioned ranges selected by the driver, then there is no hydraulic fluid pressure available at the port 108 of the switching valve 101, and, accordingly, irrespective of the automobile speed, there will be no hydraulic fluid pressure available at the port 118 of the clutch control valve 117, and, accordingly, the valve element 130 of the clutch control valve 117 will remain in its downwardly biased position indicated by 117A. At this time, the line hydraulic fluid pressure present in the passage 121 is supplied, via the one way valve 127, to the port 128 of the clutch control valve 117, and accordingly is supplied to the port 131 thereof, and thence via the passage 153 is supplied to the pump input region 154 of the fluid torque converter 1, in order to form a circulating hydraulic fluid flow passage through the fluid torque converter 1, in the manner described above.

If the automobile road speed is not greater than said certain predetermined value, then the provision of the fail safe valve 110 ensures that the direct engagement clutch 4 cannot be engaged. This will be the case even if, for some reason such as disturbance of the function of the automatic transmission, the automatic transmission is in fact in its highest speed stage available in the speed range to which it is selected by the driver, and, accordingly, hydraulic fluid pressure is available at the port 108 of the switching valve 101.

FIG. 4 shows another possible construction for the switching valve 101. This construction is designated by 101'. In FIG. 4, the parts which correspond to parts of the switching valve 101 shown in FIG. 3 are labelled with the same reference numerals as in FIG. 3. In this construction, only one valve element 103 is provided for the switching valve 101', instead of the upper valve member 103 and the lower valve member 104 provided in the first embodiment. The hydraulic fluid pressure provided at the port 105 of the switching valve 101' controls the motion of the valve element 103, in opposition to the biasing action of the compression coil spring 102, so that this upper valve member 103 is either in its downwardly biased position, as indicated in the drawing by 101'A, or is in its upwardly biased position, as indicated in the drawing by 101'B. It will be apparent that this valve 101' provides the same switching function as the valve 101 shown in FIG. 2.

In FIG. 5, there is shown still another construction for the switching valve 101 used in the embodiment of the hydraulic fluid pressure control system shown in FIG. 2. However, the functioning of this third embodiment is somewhat different from the function of the first and second embodiments shown in FIGS. 2 and 3, in that the selection of actuating hydraulic fluid pressure to operate the direct clutch is performed over three shift stages, instead of the two shift stages over which such selection was provided in the operation of the first and the second embodiments. That is to say, when the automatic transmission is set by the driver of the vehicle in the "D-overdrive" range, wherein the manual range selection valve 44 is set to the "D" range and the manual switch 97 is closed, hydraulic fluid pressure is produced at the port 108 only when the transmission is in fact in its overdrive stage condition. When the transmission is set by the driver of the automobile to the "D-non-overdrive" range, i.e., when the manual range selection valve 44 is set to the "D" range and the manual switch 97 is opened, hydraulic fluid pressure is produced at the port 108 only when the transmission is in fact providing its third speed stage. And finally, when the manual range selection valve 44 is set to the 372" range, hydraulic fluid pressure is produced at the port 108 only when the transmission is in fact providing its second speed stage.

The valve system shown in FIG. 5 comprises two identically constructed valves, the first switching valve 101" and the second switching valve 101''', each of which is exactly similar in construction to the switching valve 101' shown in FIG. 4. When no hydraulic fluid pressure is present at the point "A" in FIG. 2, which is communicated to the port 105 of the first switching valve 101", the valve element 103 thereof is in its downwardly biased position, indicated in FIG. 5 by 101"A, and, accordingly, if pressure is present at the point "B" in FIG. 2, which is communicated to the port 106, it is communicated to the port 108 of the first switching valve 101". On the other hand, when hydraulic fluid pressure is provided at the port 105 of the first switching valve 101", the valve element 103 thereof is shifted to its upwardly biased position in FIG. 5 indicated by 101"B, and the port 182 of the first switching valve 101" is communicated with the port 108. The port 182 is connected with the port 184 of the second switching valve 101'''.

The valve element 103 of the second switching valve 101''' is biased downwards in the drawings by a compression coil spring 102, and is impelled upwards in the drawings by the hydraulic fluid pressure available at the point designated by the symbol "D" in FIG. 2, so that it is either shifted to its downwardly biased position, indicated in the drawing by 101'''A, or to its upwardly biased position, indicated in the drawing by 101'''B.

When the valve element 103 of the second switching valve 101''' is in its downwardly biased position, the port 84 is communicated to its port 107, to which is supplied the hydraulic fluid pressure present at the point "C" in FIG. 2. The point "D" in FIG. 2 is branched from the passage 49a in this figure, which is connected to the output port 49 of the manual range selection valve 44. Therefore, the port 180 is supplied with the line pressure whenever either the "2" range or the "L" range is selected on the manual range selection valve 44 by the driver of the automobile.

Thus, if any range other than the "2" or "L" range is selected by the driver, then no hydraulic fluid pressure is present at this point "D," and, accordingly, the valve system shown in FIG. 5 functions in exactly the same manner as the valve shown in FIG. 4.

On the other hand, if either the "2" or the "L" range is selected by the driver of the automobile on the manual range selection valve 44, the hydraulic fluid pressure present at the point "D" in FIG. 2 impels the valve element 103 of the second switching valve 101''' to its upwardly biased position indicated by 101'''B so as to communicate the port 181 thereof, which is supplied with the hydraulic fluid pressure present at the point "E" in FIG. 2, to the port 184. This point "E," as may be seen from FIG. 2, is supplied with the hydraulic fluid pressure which actuates the second multi-disk brake 26, which is present when and only when the automatic transmission is providing the second speed stage, which, of course, is the highest speed stage available when the manual range selection valve 44 is selected to the "2" range.

In this case, therefore, when the manual range selection valve 44 is selected to the "2" range by the driver, provided that the manual switch 97 is manually or automatically opened when the manual range selecting valve 44 is shifted to "2" range, hydraulic fluid pressure will be present at the port 108 when and only when the transmission is provided the highest speed stage available within this selected "2" range.

Thus, according to this third described embodiment, it is seen that the hydraulic fluid pressure control system provides a hydraulic fluid pressure for controlling the direct clutch when, and only when, the transmission is shifted to the highest speed stage available from each of the three shift ranges selectable by the driver. This, as explained above, is a useful improvement on the prior art above outlined constructions, in which engagement of the direct clutch was only available for the very highest speed stage of the transmission, i.e., in a transmission according to the general construction of FIG. 1, only when the transmission was in overdrive condition.

Although the present invention has been shown and described in terms of some preferred embodiments thereof, and in language more or less specific with regard to structural features thereof, and with reference to the illustrative drawings, it should be understood that in any particular embodiment of the present invention various changes, modifications, and omissions of the form and the detail thereof can be made by a person skilled in the art, without departing from the essential scope of the invention.

We claim:
1. In an automatic transmission, for a vehicle comprising a throttle, comprising: a fluid torque converter having input and output members, a lock-up clutch formed with a hydraulic pressure chamber which directly connects said input and output members when hydraulic fluid pressure is supplied to the hydraulic pressure chamber; and a gear transmission mechanism comprising a plurality of hydraulic fluid actuated friction engaging devices for providing a plurality of speed stages;
 a hydraulic fluid pressure control system which provides selective supply of hydraulic fluid pressures for actuating the plurality of friction engaging devices, comprising:
 (a) a throttle hydraulic fluid pressure control valve for producing a throttle hydraulic fluid pressure according to the amount of actuation of the throttle;
 (b) a governor hydraulic fluid pressure control valve for producing a governor hydraulic fluid pressure according to the speed of the vehicle;
 (c) means for manually selecting any of a plurality of desired shift ranges;
 (d) a plurality of shift valves for selectively providing actuating hydraulic fluid pressures for the plurality of friction engaging devices, according to the shift range selected by the manual selecting means, and according to the values of the throttle hydraulic fluid pressure and the governor hydraulic fluid pressure; and (e) leading means for leading hydraulic fluid pressure to the hydraulic fluid pressure chamber of the torque converter, when any one of a plurality of shift ranges is selected by the manual selecting means, only when the highest speed stage available from the gear transmission mechanism, for that shift range, is being provided by the gear transmission mechanism;

said leading means includes a hydraulic fluid pressure switching valve comprising an output port, leading to the hydraulic fluid pressure chamber of the torque converter, and a first, a second, and a third input port;

in the hydraulic fluid pressure switching valve, the output port being connected to the third input port when and only when hydraulic fluid pressure is provided to either the first input port or the second input port;

the first input port being provided with a hydraulic fluid pressure whenever the highest speed range available for the automatic transmission is not selected by the selecting means;

the second input port being provided with a hydraulic fluid pressure which is an actuating pressure for a one of the friction engaging devices which is engaged only for producing the highest speed stage available from the gear transmission mechanism and is otherwise disengaged;

and the third input port being provided with a hydraulic fluid pressure which is an actuating pressure for a one of the friction engaging devices which is engaged for providing the highest and also the next to highest speed stage available from the gear transmission mechanism, and is otherwise disengaged, during forward operation of the gear transmission mechanism.

2. In an automatic transmission, for a vehicle comprising a throttle, comprising: a fluid torque converter having input and output members, a lock-up clutch formed with a hydraulic pressure chamber which directly connects said input and output members when hydraulic fluid pressure is supplied to the hydraulic pressure chamber; and a gear transmission mechanism comprising a plurality of hydraulic fluid actuated friction engaging devices for providing a plurality of speed stages;

a hydraulic fluid pressure control system which provides selective supply of hydraulic fluid pressures for actuating the plurality of friction engaging devices, comprising:

(a) a throttle hydraulic fluid pressure control valve for producing a throttle hydraulic fluid pressure according to the amount of actuation of the throttle;

(b) a governor hydraulic fluid pressure control valve for producing a governor hydraulic fluid pressure according to the speed of the vehicle;

(c) means for manually selecting any of a plurality of desired shift ranges;

(d) a plurality of shift valves for selectively providing actuating hydraulic fluid pressures for the plurality of friction engaging devices, according to the shift range selected by the manual selecting means, and according to the values of the throttle hydraulic fluid pressure and the governor hydraulic fluid pressure; and (e) leading means for leading hydraulic fluid pressure to the hydraulic fluid pressure chamber of the torque converter, when any one of a plurality of shift ranges is selected by the manual selecting means, only when the highest speed stage available from the gear transmission mechanism, for that shaft range, is being provided by the gear transmission mechanism;

said leading means includes a hydraulic fluid pressure switching valve comprising an output port leading to the hydraulic fluid pressure chamber of the torque converter, and a first, a second, and a third input port;

in the hydraulic fluid pressure switching valve, the output port being connected to the second input port when and only when the first input port is not provided with hydraulic fluid pressure, and being connected to the third input port when and only when the first input port is provided with hydraulic fluid pressure;

the first input port being provided with a hydraulic fluid pressure whenever the highest speed range available for the automatic transmission is not selected by the selecting means;

the second input port being provided with a hydraulic fluid pressure which is an actuating pressure for a one of the friction engaging devices which is engaged only for producing the highest speed stage available from the gear transmission mechanism and is otherwise disengaged;

and the third input port being provided with a hydraulic fluid pressure which is an actuating pressure for a one of the friction engaging devices which is engaged for producing the highest and also the next to highest speed stage available from the gear transmission mechanism, and is otherwise disengaged, during forward operation of the gear transmission mechanism.

3. In an automatic transmission, for a vehicle comprising a throttle, comprising: a fluid torque converter having input and output members, a lock-up clutch formed with a hydraulic pressure chamber which directly connects said input and output members when hydraulic fluid pressure is supplied to the hydraulic pressure chamber; and a gear transmission mechanism comprising a plurality of hydraulic fluid actuated friction engaging devices for providing a plurality of speed stages;

a hydraulic fluid pressure control system which provides selective supply of hydraulic fluid pressures for actuating the plurality of friction engaging devices, comprising:

(a) a throttle hydraulic fluid pressure control valve for producing a throttle hydraulic fluid pressure according to the amount of actuation of the throttle;

(b) a governor hydraulic fluid pressure control valve for producing a governor hydraulic fluid pressure according to the speed of the vehicle;

(c) means for manually selecting any of a plurality of desired shift ranges;

(d) a plurality of shift valves for selectively providing actuating hydraulic fluid pressures for the plurality of friction engaging devices, according to the shift range selected by the manual selecting means, and according to the values of the throttle hydraulic fluid pressure and the governor hydraulic fluid pressure; and (e) leading means for leading hydraulic fluid pressure to the hydraulic fluid pressure chamber of the torque converter, when any one of a plurality of shift ranges is selected by the manual selecting means, only when the highest speed stage available from the gear transmission mechanism, for that shift range, is being provided by the gear transmission mechanism;

said leading means comprising:

a first hydraulic fluid pressure switching valve comprising a first output port leading to the hydraulic fluid pressure chamber of the torque converter, and a first, a second, and a third input port;

in the first hydraulic fluid pressure switching valve, the first output port being connected to the second input port when and only when the first input port is not provided with hydraulic fluid pressure, and being connected to the third input port when and only when the first input port is provided with hydraulic fluid pressure;

the first input port being provided with a hydraulic fluid pressure when the highest speed range available for the automatic transmission is not selected by the selecting means;

the second input port being provided with a hydraulic fluid pressure which is an actuating pressure for a one of the friction engagement devices which is engaged only for providing the highest speed stage available from the gear transmission mechanism and is otherwise disengaged;

and a second hydraulic fluid pressure switching valve comprising a second output port connected to the third input port of the first hydraulic fluid pressure switching valve, and a fourth, a fifth, and a sixth input port;

in the second hydraulic fluid pressure switching valve, the second output port being connected to the fifth input port when and only when the fourth input port is not provided with hydraulic fluid pressure, and being connected to the sixth input port when and only when the fourth input port is provided with hydraulic fluid pressure;

the fourth input port being provided with a hydraulic fluid pressure when is not available when the highest or the next to the highest speed range is selected by the selecting means, but is available when the next to the next to the highest speed range is selected by the selecting means;

the fifth input port being provided with a hydraulic fluid pressure which is an actuating pressure for a one of the friction engaging devices which is engaged for providing the highest and the next to the highest speed stage available from the gear transmission mechanism, and is otherwise disengaged, during forward operation of the gear transmission mechanism; and the sixth input port being provided with a hydraulic fluid pressure which is an actuating pressure for a one of the friction engaging devices which is engaged for providing only the next to the next to the highest speed stage available from the gear transmission mechanism, and is otherwise disengaged.

4. A hydraulic fluid pressure control system according to claim 1, 2 or 3, wherein the leading means comprises a fail safe valve which interrupts supply of hydraulic fluid pressure to the pressure chamber of the torque converter when the speed of the vehicle is below a certain predetermined value.

5. A hydraulic fluid pressure control system according to claim 1 or 2, and further including spring means for normally biasing said hydraulic fluid pressure switching valve to a first position.

6. A hydraulic fluid pressure control system according to claim 1, wherein said hydraulic fluid pressure switching valve includes an upper valve member and a lower valve member arranged coaxially with respect to each other.

* * * * *